United States Patent
Blackshear et al.

(10) Patent No.: US 9,105,535 B2
(45) Date of Patent: Aug. 11, 2015

(54) COPPER FEATURE DESIGN FOR WARPAGE CONTROL OF SUBSTRATES

(75) Inventors: Edmund Blackshear, Wappinger Falls, NY (US); Anson Jay Call, Poughkeepsie, NY (US); Vijayeshwar Das Khanna, Millwood, NY (US); Douglas Oliver Powell, Endicott, NY (US); David John Russell, Owego, NY (US)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 13/527,280

(22) Filed: Jun. 19, 2012

(65) Prior Publication Data

US 2013/0334711 A1    Dec. 19, 2013

(51) Int. Cl.
| | |
|---|---|
| H05K 1/03 | (2006.01) |
| H01L 23/14 | (2006.01) |
| G06F 17/50 | (2006.01) |
| H01L 23/498 | (2006.01) |

(52) U.S. Cl.
CPC .......... *H01L 23/145* (2013.01); *G06F 17/5009* (2013.01); *H01L 23/49822* (2013.01); *G06F 2217/42* (2013.01); *H01L 23/49838* (2013.01); *H01L 2924/0002* (2013.01)

(58) Field of Classification Search
CPC ......... H05K 3/28; H05K 3/46; H05K 3/4602; H05K 3/4611; H05K 3/4614; H05K 3/4617
USPC .................. 174/255, 250, 253, 256, 257, 261
See application file for complete search history.

(56) References Cited

U.S. PATENT DOCUMENTS

| | | | |
|---|---|---|---|
| 8,014,154 B2 | 9/2011 | Lee | 361/749 |
| 8,022,310 B2 | 9/2011 | Okazaki et al. | 174/255 |
| 2010/0116530 A1 | 5/2010 | Okazaki | 174/257 |
| 2011/0232949 A1 | 9/2011 | Yamada et al. | 174/255 |
| 2011/0272186 A1 | 11/2011 | Freda et al. | 174/258 |

FOREIGN PATENT DOCUMENTS

| | | |
|---|---|---|
| JP | 2002067221 | 3/2002 |
| JP | 2004013437 | 1/2004 |
| JP | 2004200265 | 7/2004 |
| JP | 2005167141 | 6/2005 |
| JP | 2007227867 | 9/2007 |
| JP | 2007253366 | 10/2007 |
| JP | 2010109036 | 5/2010 |

OTHER PUBLICATIONS

Machine Translation of Japanese Patent Publication No. 2005-167141 (Jun. 23, 2005).*

* cited by examiner

*Primary Examiner* — Tremesha S Willis
(74) *Attorney, Agent, or Firm* — VanLeeuwen & VanLeeuwen; Damion C. Josephs (57) ABSTRACT

An approach is provided in which a laminate substrate includes top layers, bottom layers, and a core layer. The top layers are positioned between the core layer and a top surface metallurgy (TSM) layer and include at least one top conductive layer. The bottom layers are positioned between the core layer and a bottom surface metallurgy (BSM) layer and include at least one bottom conductive layer that includes a material void pattern that is based upon the top conductive layer and reduces warpage of the laminate substrate.

8 Claims, 9 Drawing Sheets

| | Product | Body size, mm | Build-up layers (per side) | Top-bottom copper balance | Bottom side relative wiring density | Absolute warpage @ 25 C (um) | Thermal warpage (um) |
|---|---|---|---|---|---|---|---|
| 405 | S | 55 | 4 | 0.5% | High | -10 | -20 |
| 410 | M | 50 | 4 | 1.8% | Medium | 10 | -35 |
| 415 | L | 47 | 4 | 0.1% | Medium-low | 25 | -35 |
| 420 | B | 42.5 | 4 | 1.1% | Low | 25 | -35 |
| | 425 | 430 | 435 | 440 | 445 | 450 | 455 |

| | Test Vehicle Name | Mean Absolute warpage, um (25 C) | Mean Thermal warpage, um |
|---|---|---|---|
| 462 | A | 92 | -95 |
| 464 | AB | 73 | - |
| 466 | O | 71 | -75 |
| 468 | OB | 48 | - |
| 470 | T | -9 | -70 |
| 472 | TB | -12 | - |
| 474 | P | 66 | - |
| 476 | PB | 49 | - |
| | | 485 | 490 |

COPPER FEATURE DESIGN FOR WARPAGE CONTROL OF SUBSTRATES

BACKGROUND

The present disclosure relates to minimizing laminate substrate warpage. More particularly, the present disclosure relates to analyzing a pair of conductive layers included in the laminate substrate and removing conductive material from one of the paired conductive layers according to the layout of the other paired conductive layer.

Laminate substrates are designed for electrical functionality and typically include a glass fiber reinforced core; "top" and "bottom" conductive layers; and top/bottom dielectric layers that are placed between the conductive layers. The conductive layers include a conductive material (e.g., copper) that is circuitized during fabrication according to each layer's corresponding design. The top conductive layers are typically utilized for signal routing (wiring layers) and the bottom conductive layers are typically utilized as power layers (voltage and ground).

Laminate warpage results when a different bending resistance and/or bending force exists above and below the laminate substrate's core. A coefficient of thermal expansion (CTE) mismatch between the dielectric layers and the copper remaining on the conductive layers and dielectric cure shrinkage during fabrication are driving forces for bending as the temperature changes, such as during module assembly operations or during laminate fabrication.

BRIEF SUMMARY

According to one embodiment of the present disclosure, an approach is provided in which a laminate substrate includes top layers, bottom layers, and a core layer. The top layers are positioned between the core layer and a top surface metallurgy (TSM) layer and include at least one top conductive layer. The bottom layers are positioned between the core layer and a bottom surface metallurgy (BSM) layer and include at least one bottom conductive layer that includes a material void pattern that is based upon the top conductive layer and reduces warpage of the laminate substrate.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

Figure 1:
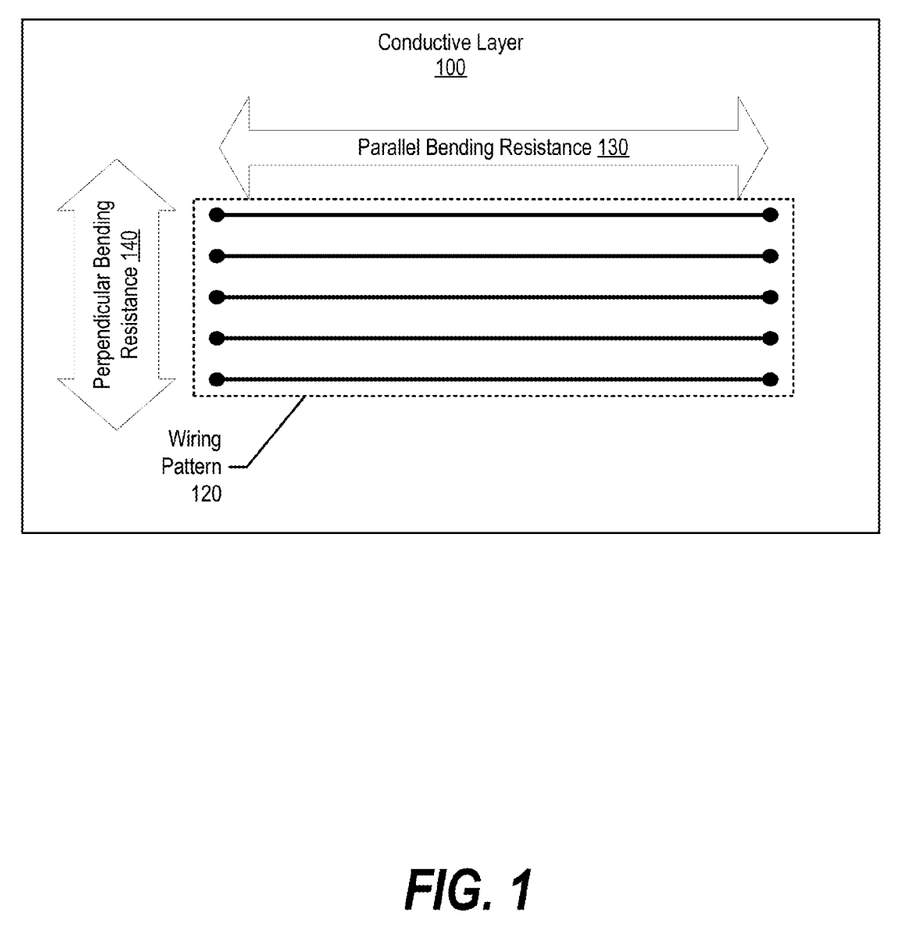
FIG. 1 is a diagram showing a wiring pattern circuitized on a conductive layer that produces directional bending resistance components.

FIG. 1 is a diagram showing a wiring pattern circuitized on a conductive layer that produces directional bending resistance components. A typical laminate substrate design includes conductive layers that are utilized as "wiring" layers and "power" or "ground" layers. The wiring layers include copper lines that make electrical connections between two or more nodes on the wiring layer, and the power layers supply power (voltage or ground) to nodes included on the power layers. In one embodiment, the laminate substrate may be utilized in a flip chip plastic ball grid array (FCPBGA) package. In this embodiment, the wiring layers are typically included on top of a core layer, referred to herein as top conductive layers, and the power layers are included on bottom of the core layer, herein referred to as bottom conductive layers (see FIG. 2 and corresponding text for further details) although some power layers may be included in the top layers. As those skilled in the art can appreciate, a laminate substrate may be utilized in other applications such as with coreless chip carriers, flip chip plastic land grid array (FCPLGA) packages, and wirebond packages.

A wiring layer may include multiple conductive tracks that are routed in groups with spaces between the conductive tracks, herein referred to as wiring patterns. FIG. 1 shows wiring pattern 120 located on conductive layer 100. Conductive layer 100 is included in a laminate substrate and is "paired" with another conductive layer on opposite sides of the laminate substrate's core layer.

Wiring pattern 120 produces two different bending resistances, which are parallel bending resistance 130 and perpendicular bending resistance 140. Bending resistances 130 and 140 are different from each other because wiring pattern 120 allows conductive layer 100 (in combination with a coupled dielectric layer) to "bend" or warp easier in a direction perpendicular to the conductive tracks compared with the direction parallel to wiring pattern 120.

As such, these directional bending resistance components cause conductive layer 100 to be more susceptible to warpage in a direction perpendicular to wiring pattern 120 when conductive layer 100's paired bottom conductive layer is a power layer that comprises mostly a copper plane. To create a laminate substrate with minimal thermal warpage, this disclosure describes an approach to modify conductive layer 100's paired bottom conductive layer by including material void patterns that removes copper in selected areas, thus decreasing bending resistances on the bottom conductive layer to correspond with conductive layer 100's varying bending resistances.

Figure 2:
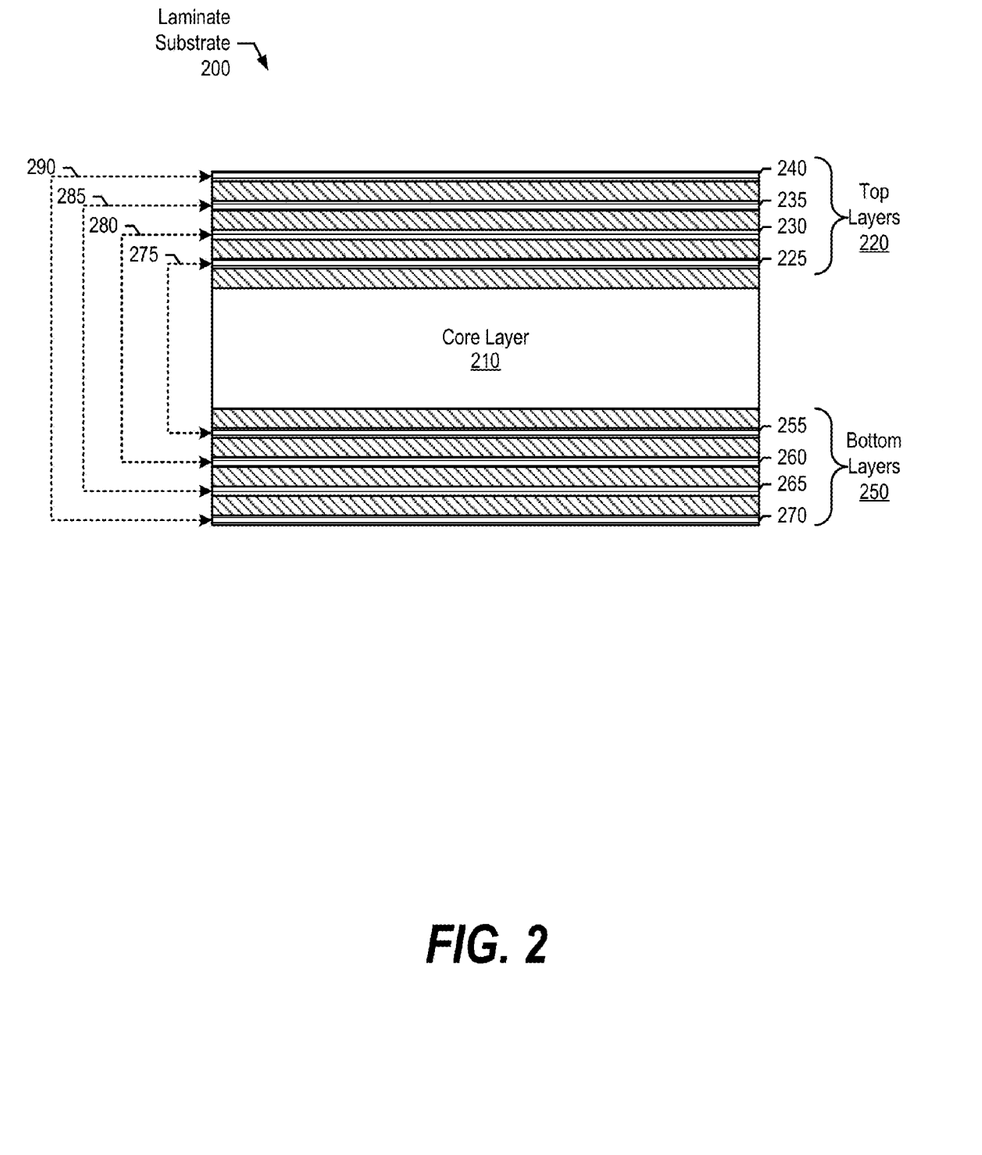
FIG. 2 is a diagram showing a laminate substrate that includes multiple conductive layer pairs.

FIG. 2 is a diagram showing a laminate substrate that includes multiple conductive layer pairs. Laminate substrate 200 includes core layer 210, top layers 220, and bottom layers 250. Top layers 220 include top conductive layers 225, 230, 235, 240, and dielectric layers placed between the conductive layers. Bottom layers 250 include bottom conductive layers 255, 260, 265, 270, and dielectric layers placed between the conductive layers.

Each of the top conductive layers is paired with one of the bottom conductive layers according to their distance from core 210. As such, each of conductive layer pairs 275, 280, 285, and 290 include top conductive layers and bottom conductive layers that are equidistant to core layer 210. In one embodiment, top conductive layer 240 is a top surface metallurgy (TSM) layer on which a flip chip die attaches. In this embodiment, bottom conductive layer 270 is a bottom surface metallurgy (BSM) layer on which solder balls attach (for soldering to a printed circuit board).

Figure 3A:
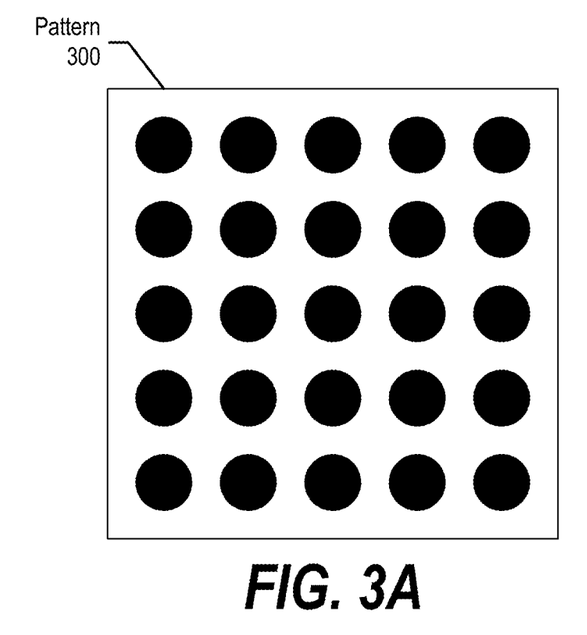
FIGS. 3A and 3B are diagrams showing conductive patterns including equivalent amounts of copper that produce different thermal expansion coefficients, different moduli, and bending resistances.
Figure 3B:
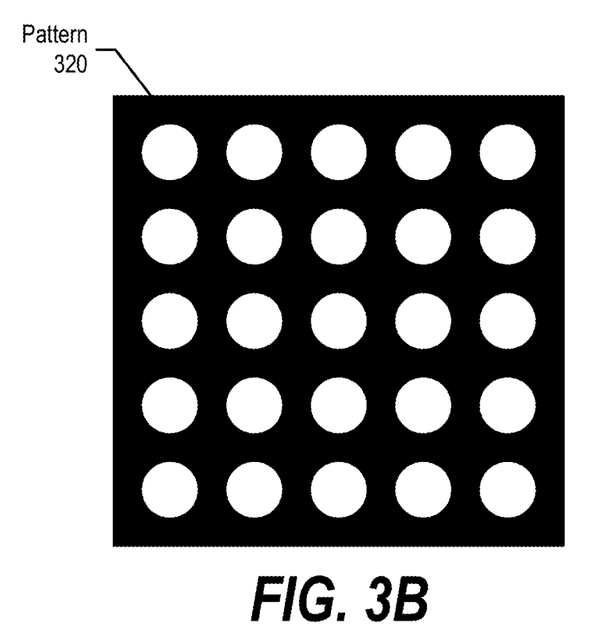

FIGS. 3A and 3B are diagrams showing conductive patterns that produce different bending resistances. Each of patterns 300 and 320 include the same amount of conductive material (e.g., copper represented as white area), but pattern 300's contiguous nature produces a higher bending resistance than pattern 320 (harder to bend). As such, the copper pattern on a conductive layer is more significant to minimizing warpage than the actual amount of copper on the conductive layer. Therefore, by removing copper from a power layer in areas corresponding to the power plane layer's paired wiring layer layout, warpage is minimized.

Figure 4A:
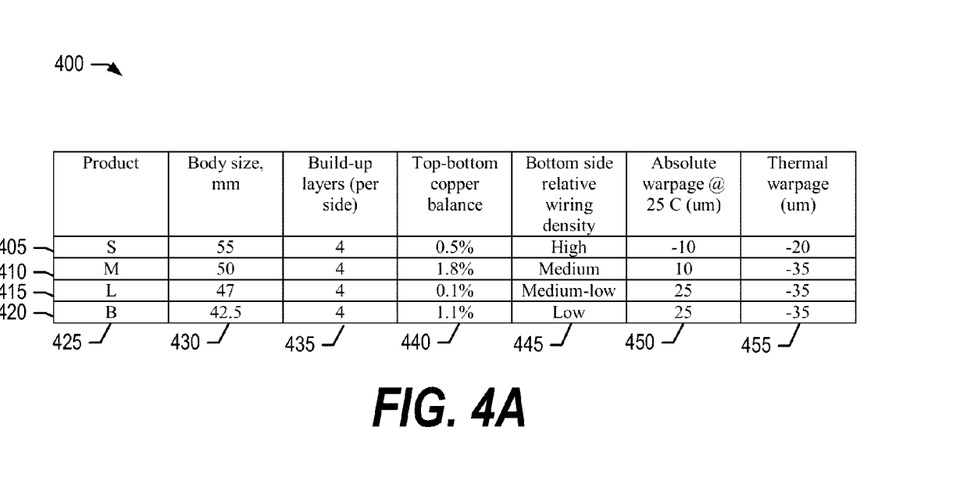
FIG. 4A shows a table that compares warpage between four different samples.

FIG. 4A shows a table that compares warpage between four different samples. When determining the warpage contributors to a laminate substrate, many factors are involved in the design and process. Contributors such as fixtures and clamping are called macroprocess effects, and normal process variability such as copper thickness uniformity and line width variations are called microprocess effects. Warpage can be described in terms of absolute warpage, which is the laminate substrate warpage at room temperature or other temperatures of interest, and thermal warpage which describes how much the laminate warpage changes during thermal excursions. For example: THERMAL WARPAGE=WARPAGE @ 225 C−WARPAGE @ 25 C. The laminate substrate design plays a significant role in the absolute and thermal warpage, whereas the macro and micro process effects contribute to the variability.

The copper balancing alone is insufficient to reduce warpage. Instead, the combination of CTE balance and bending resistance balance (e.g., modulus) minimizes warpage. In one embodiment, a typical FCPBGA design has more wiring layers on the top side of the core layer and less wiring layers on the bottom side of the core layer. Layers with more wiring patterns tend to have a higher CTE (coefficient of thermal expansion) and a lower bending resistance, and solid plane layers have a higher bending resistance and lower CTE, even though they may have the same percent copper in the layers. A higher CTE is a driving force for bending as is cure shrinkage of the dielectric, while the copper is a resistive force of the bending of the laminate substrate.

To illustrate this effect, table 400 includes design entries for four different product designs. Table 400 includes designs 405, 410, 415, and 420, which correspond to four different laminate substrate designs. Column 425 includes a product reference letter for each design entry. Column 430 includes a body size of the laminate substrate. Column 435 includes the number of conductive layer pairs added above and below the core. As can be seen, each of the design entries includes four conductive layers added to the top of the core layer, and four conductive layers added to the bottom of the core layer. Column 440 includes a percentage of copper balance between top layers and the bottom layers (e.g., the amount of copper in the top layers compared with the amount of copper in the bottom layers). The four design entries each have a copper balance within 2%.

Column 445 includes a bottom side relative wiring density compared with the top layers. A low wiring density indicates a relatively solid power plane (typical configuration) and a high wiring density indicates a power plane with multiple non-contiguous copper sections. Column 450 includes the absolute warpage of the laminate substrate, and column 455 includes the thermal warpage of the laminate substrate. Warpage measurements are in microns (um) and are reported with the convention that a positive warpage means the shape is concave with the die attach site up (meaning the laminate substrate corners are higher than the center) and convex shapes are reported as a negative number.

As can be seen in table 400, although design 405 has the largest laminate substrate (55 mm), when compared with designs 410, 415, and 420 design 405 also has the lowest absolute warpage at room temperature and the lowest thermal warpage (the least change in warpage when heating from 25 C to 225 C). A primary reason for such low warpage is design 405's high bottom side relative wiring density. This is because adding more wiring on the bottom side allows the bottom conductive layers to more closely match the paired top layers for CTE and bending resistance.

Figure 4B:
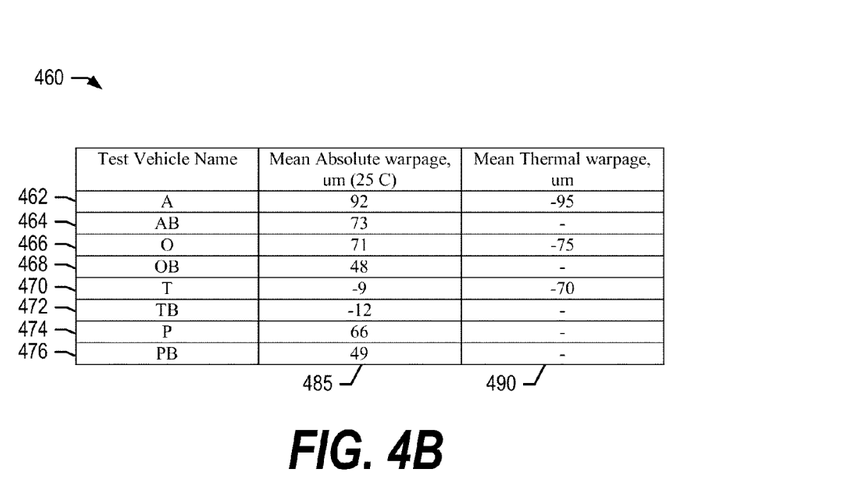
FIG. 4B shows a table that includes laminate substrate design examples that change the copper patterns on paired top and bottom side layers to match bending resistances.

FIG. 4B shows a table that includes laminate substrate design examples that change the copper patterns on paired top and bottom side layers to match bending resistances. Table 460 includes various designs based off a test vehicle design (design 462). Design 462 has a 55 mm×55 mm body size and a 400 um core layer with five build-up layers on each side of the core (most of the wiring is on the top conductive layers). The total copper content on the corresponding top and bottom layers are balanced within 3%. Table 460 shows that design 462 has considerable warpage even though the copper on the corresponding layers are balanced. Column 485 shows that design 462 has 92 um absolute warpage, and column 490 shows that design 462 has −95 um thermal warpage.

Design 464 is the same design as design 462 except that more dielectric has been added to the bottom layers. This does not change the copper balance but it does change the effective CTE and bending force. Having more dielectric results in a higher CTE and higher bending force on the bottom layers compared to design 462. The result is a lower, or less concave, warpage as shown in column 485.

Design 466 illustrates the effect of reducing the copper bending resistance on the bottom layers to match the bending resistance of the top layers. Design 466's design includes removing copper from the bottom conductive layers in a pattern intended to mirror the wiring patterns on the paired top conductive layers. This results in about 4% less copper in the bottom layers and by selective copper removal essentially provides a better match of the bending resistance of the bottom layers compared to the top layers. The combination of lower stiffness and less copper resulted in a 21 um, or 23% reduction in absolute warpage and a 20 um, or 21% reduction in thermal warpage.

Design 468 is essentially the same design as design 466 but with more dielectric added to the bottom layers. Compared to the original design shown as design 462, design 468 has a 48% reduction in absolute warpage.

Design 470 is essentially the same design as design 466 but with additional copper removed such that there is about 10% less copper in the bottom layers. Design 470, therefore, has a lower copper bending resistance on the bottom layers, which is less than that of the top layers, and is also unbalanced with respect to total copper. Design 470 has about 10% less copper on the bottom layers compared with the top layers. The result is a design that has a mean absolute warpage reduction of about 101 um, or a 110% reduction in warpage. In fact, table 400 shows that the warpage was changed significantly and resulted in an overall convex, rather than concave, shape. In addition, design 470 shows a 26% reduction in the thermal warpage (column 490).

Design 472 is essentially the same design as design 470 but with increased dielectric in the bottom layers. A further reduction in warpage, creating a more convex warpage.

Design 474 shows that the bending resistance, not the copper content, is the key to manipulating laminate warpage. Design 474 has approximately 10% of the copper removed in the bottom layers plane layers compared to original design 462. However, in the case of design 474, the copper was removed using perforations rather than slots or channels. As such, the copper content is less but the bending resistance of the bottom layers are not significantly changed. This results in a 26 um, or 28% warpage reduction compared with design 462. Design 476 is essentially the same design as design 474 but with more dielectric added to the bottom layers, which results in an additional reduction of warpage.

Designs 470 and 474, when compared with design 462, have about 10% less copper on the bottom layers compared to the top layers. The significant difference is the pattern by which the copper is removed. Design 474 had copper removed in a way that did not significantly change the layer bending resistance and had a resulting 28% warpage reduction compared to design 462, whereas design 470 had the same amount of copper removed but in a way intended to effectively reduce the layer bending resistance and match it more closely to the top layer, resulting in a 110% reduction in warpage.

Figure 5:
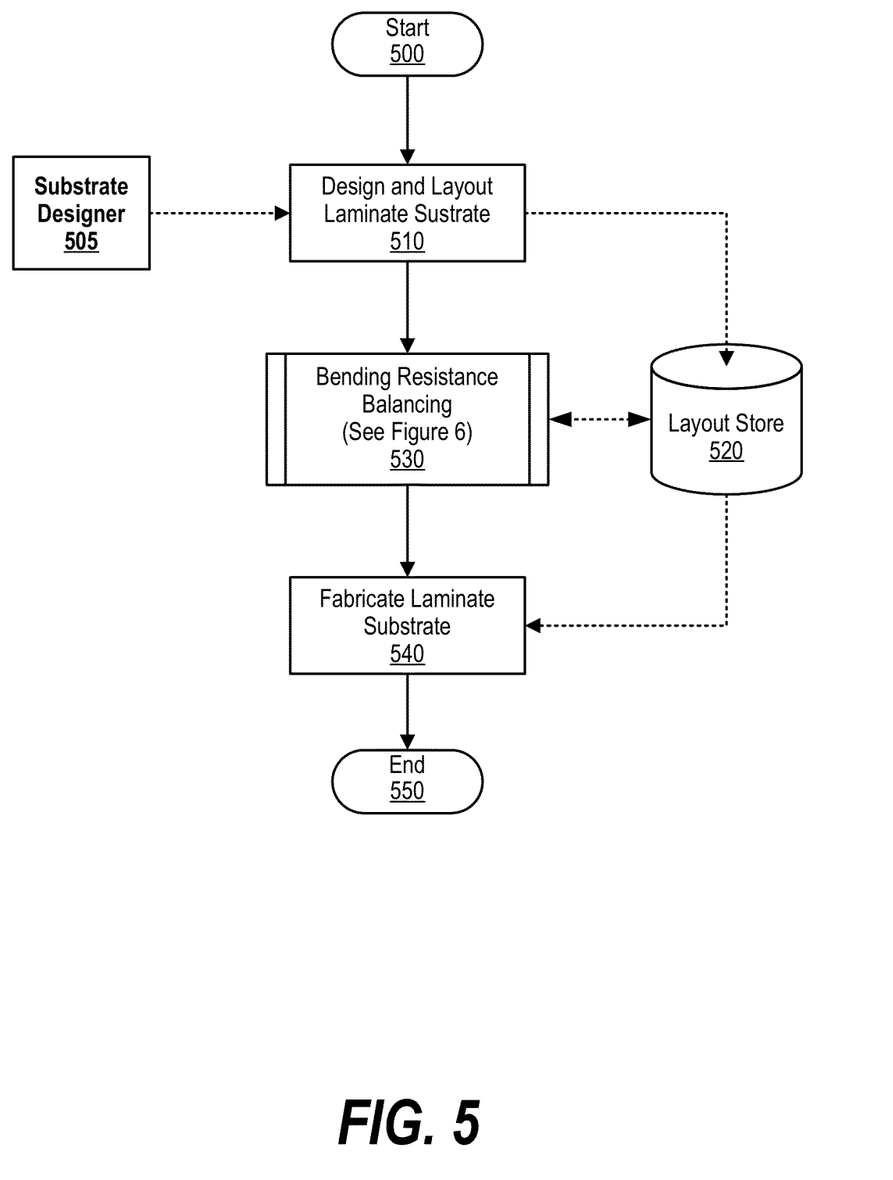
FIG. 5 is a high level diagram showing steps taken in creating a laminate substrate with minimal warpage properties.

FIG. 5 is a high level diagram showing steps taken in creating a laminate substrate with minimal warpage properties. In one embodiment, to create a laminate substrate with less thermal warpage and less absolute warpage. As those skilled in the art can appreciate, other approaches may be utilized to equalize bottom layer bending resistances to top layer bending resistances.

Processing commences at 500, whereupon substrate designer 505 designs a laminate substrate, for example, a FCBGA device (step 510). The design includes, for example, routing wires that connects a flip chip die interface on the TSM layer of the laminate substrate to the BGA package interface (balls) on the BSM layer of the laminate substrate. Processing stores the laminate substrate layout in layout store 520.

Figure 6:
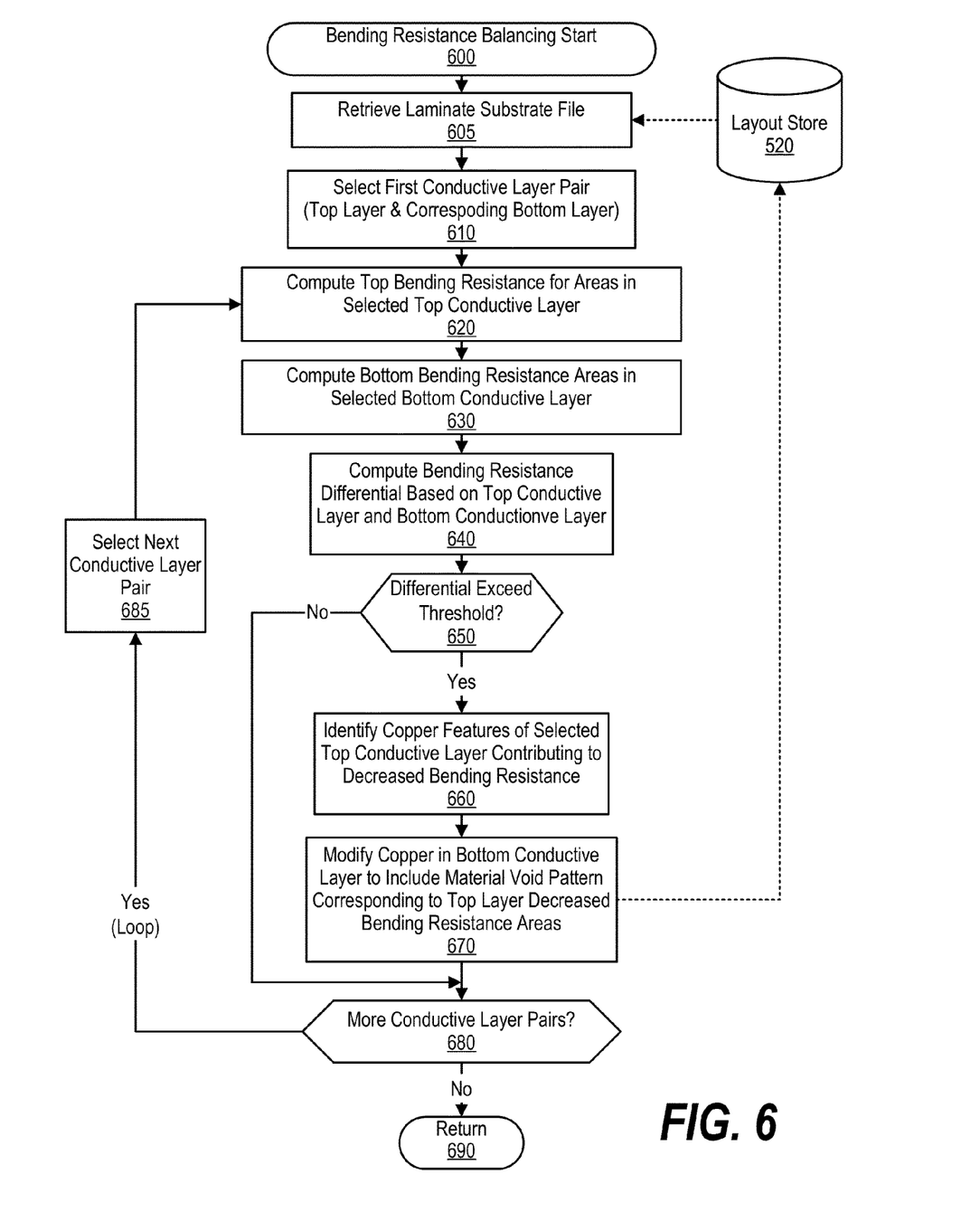
FIG. 6 is a flowchart showing steps taken in modifying bottom conductive layers according to bending resistance differences between the bottom conductive layers and corresponding top conductive layers.

Next, processing proceeds through a series of steps to mitigate warpage by removing copper areas, in one embodiment, from bottom conductive layers based upon their corresponding top conductive layers' layout (pre-defined process block 530, see FIG. 6 and corresponding text for further details). Once processing balances the warpage, the laminate substrate is produced using the modified laminate substrate layout file at step 540 and processing ends at 550.

FIG. 6 is a flowchart showing steps taken in modifying bottom conductive layers according to bending resistance differences between the bottom conductive layers and corresponding top conductive layers. Processing commences at 600, whereupon processing retrieves a laminate substrate file from layout store 520 at step 605. The laminate substrate file, in one embodiment, corresponds to an FCPBGA substrate that may have wiring layers above a laminate core and power layers below the laminate core. The layers are organized in pairs such that each top conductive layer corresponds to a bottom conductive layer (see FIG. 2 and corresponding text for further details).

At step 610, processing selects a conductive layer pair, such as the first two conductive layers closest to the laminate core. At step 620, processing computes bending resistances for areas on the top layer. In one embodiment, processing may segment the top conductive layer into a grid and compute bending resistances for each grid area. In another embodiment, processing may identify wiring patterns in the top conductive layer instead of computing bending resistances. At step 630, processing computes bending resistances for areas on the selected bottom conductive layer.

Next, in one embodiment, processing computes bending resistance differentials between the top layer areas and the bottom layer areas (step 640). In another embodiment, processing may compute bending resistance ratios using the top bending resistances and the bottom bending resistances. For example, processing may divide each layer into a sixteen by sixteen grid and compute sixteen different ratios for each grid area.

A determination is made as to whether one or more of the bending resistance differentials exceed a threshold (decision 650). In one embodiment, instead of or in addition to comparing the bending resistance differential, processing may identify the top conductive layer wiring patterns that contribute significantly to the top layer bending resistances.

If one or more of the bending resistance differences exceeds the threshold, decision 650 branches to the "Yes" branch, whereupon processing identifies copper features (e.g., wiring patterns) on the top conductive layer that are contributing to the excessive bending resistance differences (step 660). For example, the top conductive layer may include a large amount of parallel signal tracks in a concentrated area (see FIG. 7A and corresponding text for further details).

Figure 7A:
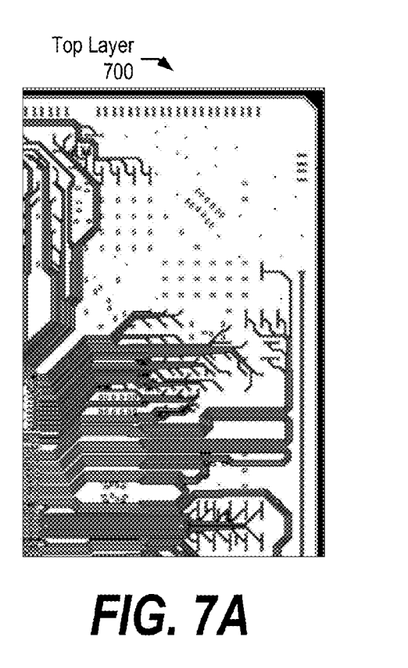
FIG. 7A is an example of a top conductive layer design that is utilized as a wiring layer.
Figure 7B:
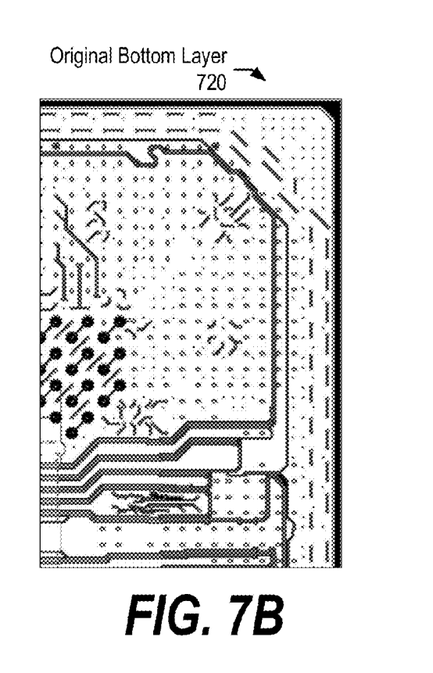
FIG. 7B is an example of a bottom conductive layer that is paired to top layer 700 to form a conductive layer pair.
Figure 7C:
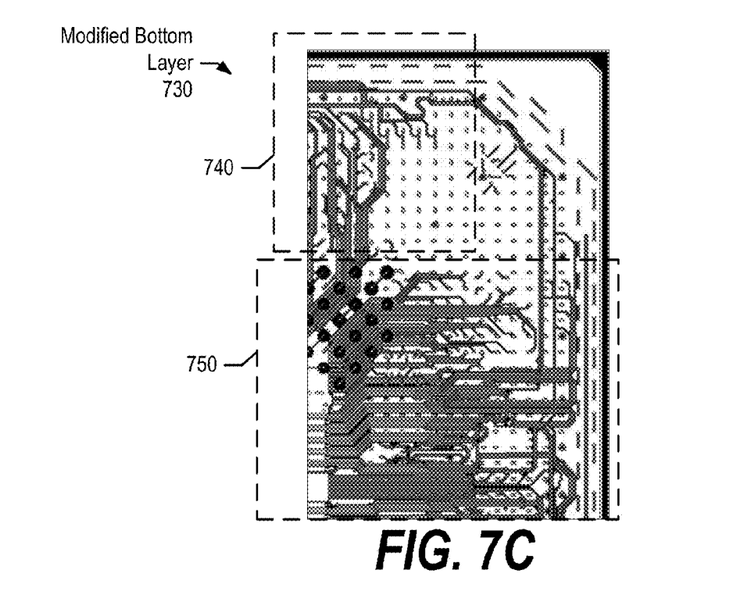
FIG. 7C is a diagram of a modified bottom conductive layer based upon a corresponding top layer's design.

At step 670, processing modifies the bottom conductive layer design by including material void patterns (areas that remove copper) to balance the top layer's wiring patterns in order to adjust the bending resistance differences to an acceptable level (see FIGS. 7B, 7C, and corresponding text for further details). Referring back to decision 650, if the bending resistance differences do not exceed the threshold, decision 650 branches to the "No" branch, bypassing steps 660 and 670.

A determination is made as to whether there are more conductive layer pairs to analyze (decision 680). If there are more conductive layer pairs to analyze, decision 680 branches to the "Yes" branch, which loops back to select (step 685) and process the next conductive layer pair. This looping continues until there are no more conductive layer pair to analyze, at which point decision 680 branches to the "No" branch whereupon processing returns at 690.

FIG. 7A is an example of a top conductive layer design that is utilized as a wiring layer. Top layer 700 includes groups of conductive tracks (wiring patterns), such as for a bus interface, which cause top layer 700 to exhibit "directional" bending resistances. Meaning, as discussed herein, the wiring patterns produce a higher bending resistance in a direction parallel to the wiring patterns when compared with the bending resistance in a perpendicular direction (see FIG. 1 and corresponding text for further details).

FIG. 7B is an example of a bottom conductive layer that is paired to top layer 700 to form a conductive layer pair. For example, top layer 600 and original bottom layer 720 may be the first top and bottom layers in a laminate substrate. Original bottom layer 720 includes large areas of conductive material and may be utilized, for example, as a power plane. As such, when compared with top layer 700, bending resistance differentials are produced at various locations on original bottom layer 720 to warrant changes to original bottom layer 720 (see FIG. 7C and corresponding text for further details).

FIG. 7C is a diagram of a modified bottom conductive layer based upon a corresponding top layer's design. Modified bottom layer 730 is the result of adding material void patterns to original bottom layer 720 based upon the design of top layer 700. As can be seen, sections 740 and 750 include material void patterns that mirror the conductive tracks in top layer 700 in order to balance bending resistances in these sections. In turn, top layer 700 and modified bottom layer 730 form a balanced conductive layer pair.

Figure 8:
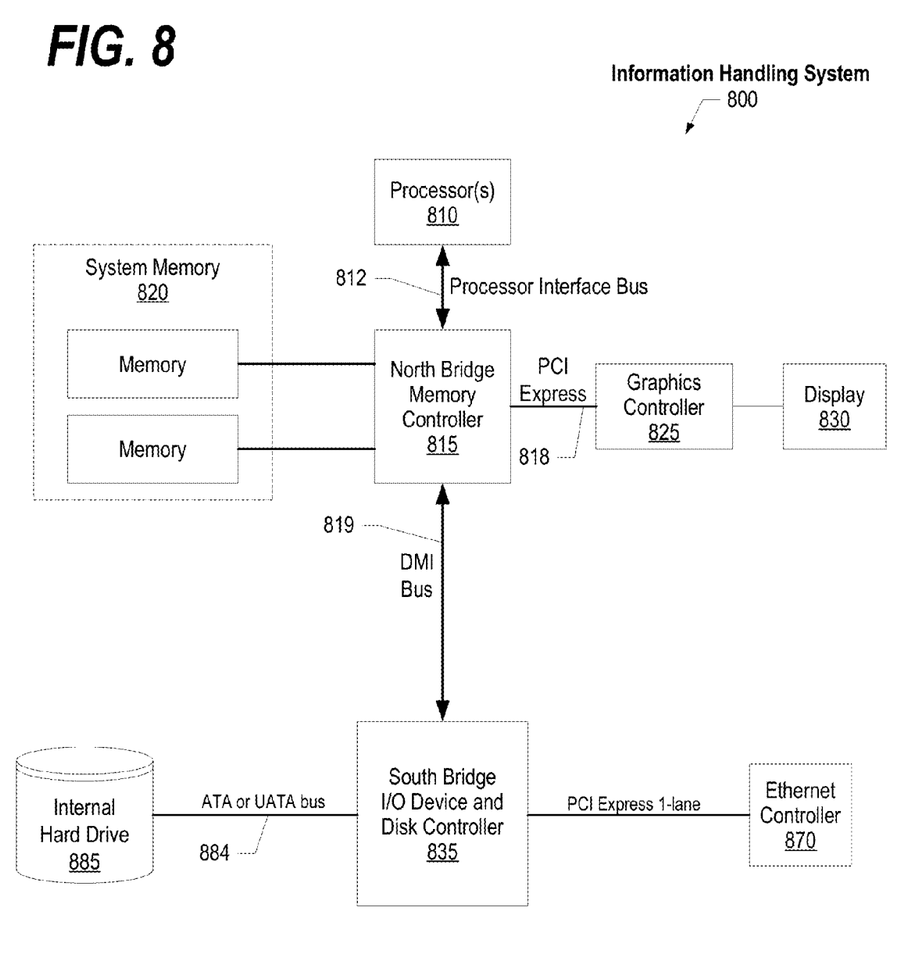
FIG. 8 illustrates an information handling system, which is a simplified example of a computer system capable of performing the computing operations described herein.

FIG. 8 illustrates information handling system 800, which is a simplified example of a computer system capable of performing the computing operations described herein. Information handling system 800 includes one or more processors 810 coupled to processor interface bus 812. Processor interface bus 812 connects processors 810 to Northbridge 815, which is also known as the Memory Controller Hub (MCH). Northbridge 815 connects to system memory 820 and provides a means for processor(s) 810 to access the system memory. Graphics controller 825 also connects to Northbridge 815. In one embodiment, PCI Express bus 818 connects Northbridge 815 to graphics controller 825. Graphics controller 825 connects to display device 830, such as a computer monitor.

Northbridge 815 and Southbridge 835 connect to each other using bus 819. In one embodiment, the bus is a Direct Media Interface (DMI) bus that transfers data at high speeds in each direction between Northbridge 815 and Southbridge 835. In another embodiment, a Peripheral Component Interconnect (PCI) bus connects the Northbridge and the Southbridge. Southbridge 835, also known as the I/O Controller Hub (ICH) is a chip that generally implements capabilities that operate at slower speeds than the capabilities provided by the Northbridge. Southbridge 835 typically provides various busses used to connect various components. These busses include, for example, PCI and PCI Express busses, an ISA bus, a System Management Bus (SMBus or SMB), and/or a Low Pin Count (LPC) bus.

Other components often included in Southbridge 835 include a Direct Memory Access (DMA) controller, a Programmable Interrupt Controller (PIC), and a storage device controller, which connects Southbridge 835 to nonvolatile storage device 885, such as a hard disk drive, using bus 884. Ethernet controller 870 connects to Southbridge 835 using a bus, such as the PCI or PCI Express bus. Ethernet controller 870 connects information handling system 800 to a computer network, such as a Local Area Network (LAN), the Internet, and other public and private computer networks.

While FIG. 8 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 9:
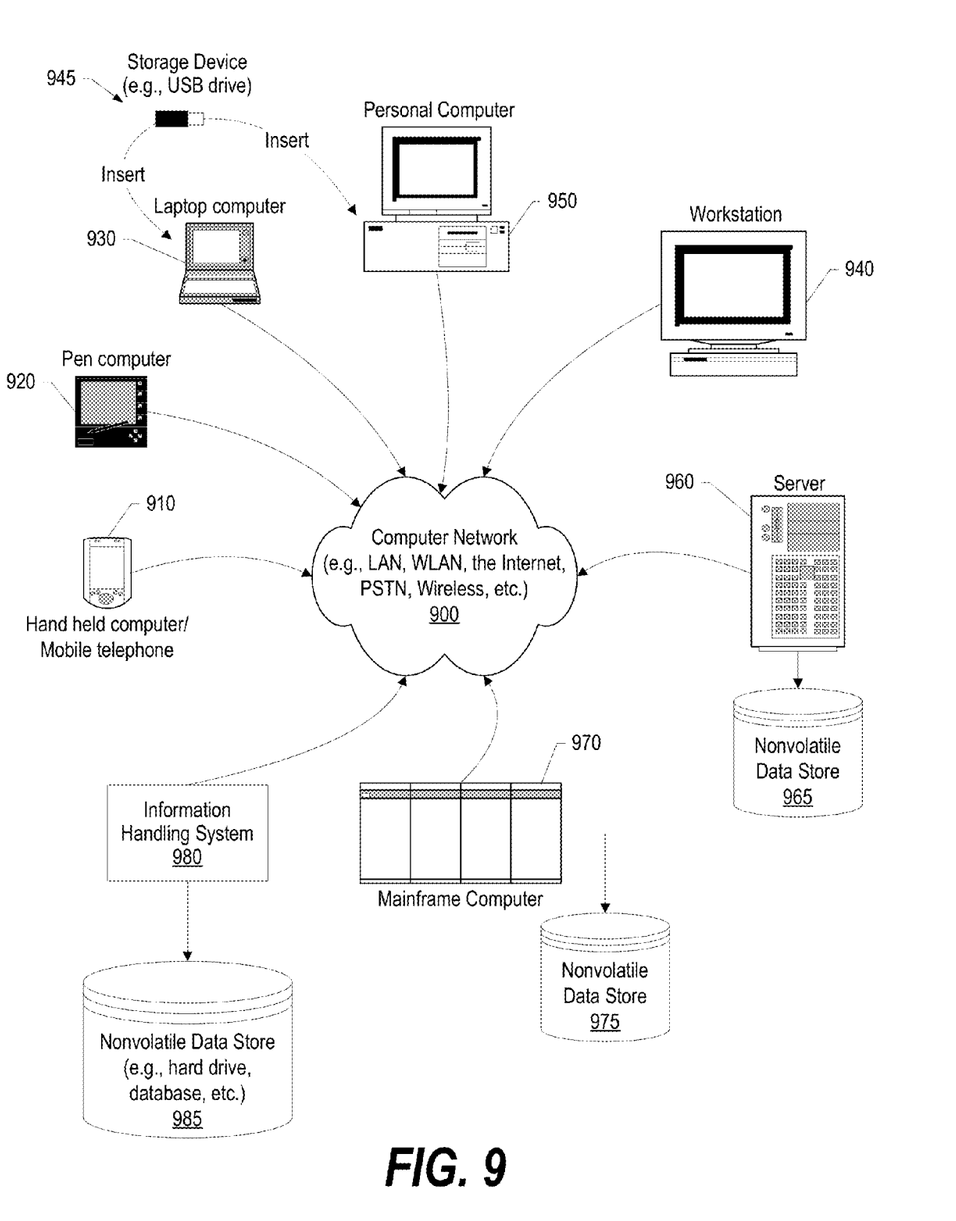
FIG. 9 provides an extension of the information handling system environment shown in FIG. 8 to illustrate that the methods described herein can be performed on a wide variety of information handling systems which operate in a networked environment.

FIG. 9 provides an extension of the information handling system environment shown in FIG. 8 to illustrate that the methods described herein can be performed on a wide variety of information handling systems that operate in a networked environment. Types of information handling systems range from small handheld devices, such as handheld computer/mobile telephone 910 to large mainframe systems, such as mainframe computer 970. Examples of handheld computer 910 include personal digital assistants (PDAs), personal entertainment devices, such as MP3 players, portable televisions, and compact disc players. Other examples of information handling systems include pen, or tablet, computer 920, laptop, or notebook, computer 930, workstation 940, personal computer system 950, and server 960. Other types of information handling systems that are not individually shown in FIG. 9 are represented by information handling system 980. As shown, the various information handling systems can be networked together using computer network 900. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 9 depicts separate nonvolatile data stores (server 960 utilizes nonvolatile data store 965, mainframe computer 970 utilizes nonvolatile data store 975, and information handling system 980 utilizes nonvolatile data store 985). The nonvolatile data store can be a component that is external to the various information handling systems or can be internal to one of the information handling systems. In addition, removable nonvolatile storage device 945 can be shared among two or more information handling systems using various techniques, such as connecting the removable nonvolatile storage device 945 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. An apparatus comprising:
   a laminate substrate, the laminate substrate comprising:
      a core layer comprising a glass reinforced epoxy;

one or more top layers positioned between the core layer and a top surface metallurgy (TSM) layer, wherein at least one of the top layers is a top conductive layer comprising a wiring pattern that electrically connects a plurality of first nodes on the top conductive layer; and one or more bottom layers positioned between the core layer and a bottom surface metallurgy (BSM) layer, wherein at least one of the bottom layers is a bottom conductive layer, the bottom conductive layer further comprising:

a material void pattern that corresponds to the wiring pattern included on the top conductive layer, wherein the material void pattern reduces warpage of the laminate substrate.

2. The apparatus of claim 1 wherein the bottom conductive layer includes copper that electrically connects a plurality of second nodes included on the bottom conductive layer, and wherein the material void pattern fails to change the electrical connectivity between the plurality of second nodes.

3. The apparatus of claim 1 wherein the top conductive layer and the bottom conductive layer are paired and are equidistant from the core layer.

4. The apparatus of claim 3 wherein the laminate substrate further comprises:

a plurality of top conductive layers that includes the top conductive layer;

a plurality of bottom conductive layers that includes the bottom conductive layer, wherein each of the plurality of bottom conductive layers are paired to one of the plurality of top conductive layers, and wherein each of the plurality of bottom conductive layers includes one or more different material void patterns that are based upon one or more different wiring patterns included in their corresponding paired top conductive layer.

5. The apparatus of claim 1 wherein the material void pattern is a channel pattern that forms one or more non-contiguous shapes.

6. The apparatus of claim 5 wherein the channel pattern includes straight lines that forms the one or more non-contiguous shapes.

7. The apparatus of claim 5 wherein the channel pattern includes irregular curved lines.

8. The apparatus of claim 1 further comprising:

a flip chip die attached to the TSM layer; and a plurality of connection contact pads attached to the BSM layer.

* * * * *